UNITED STATES PATENT OFFICE.

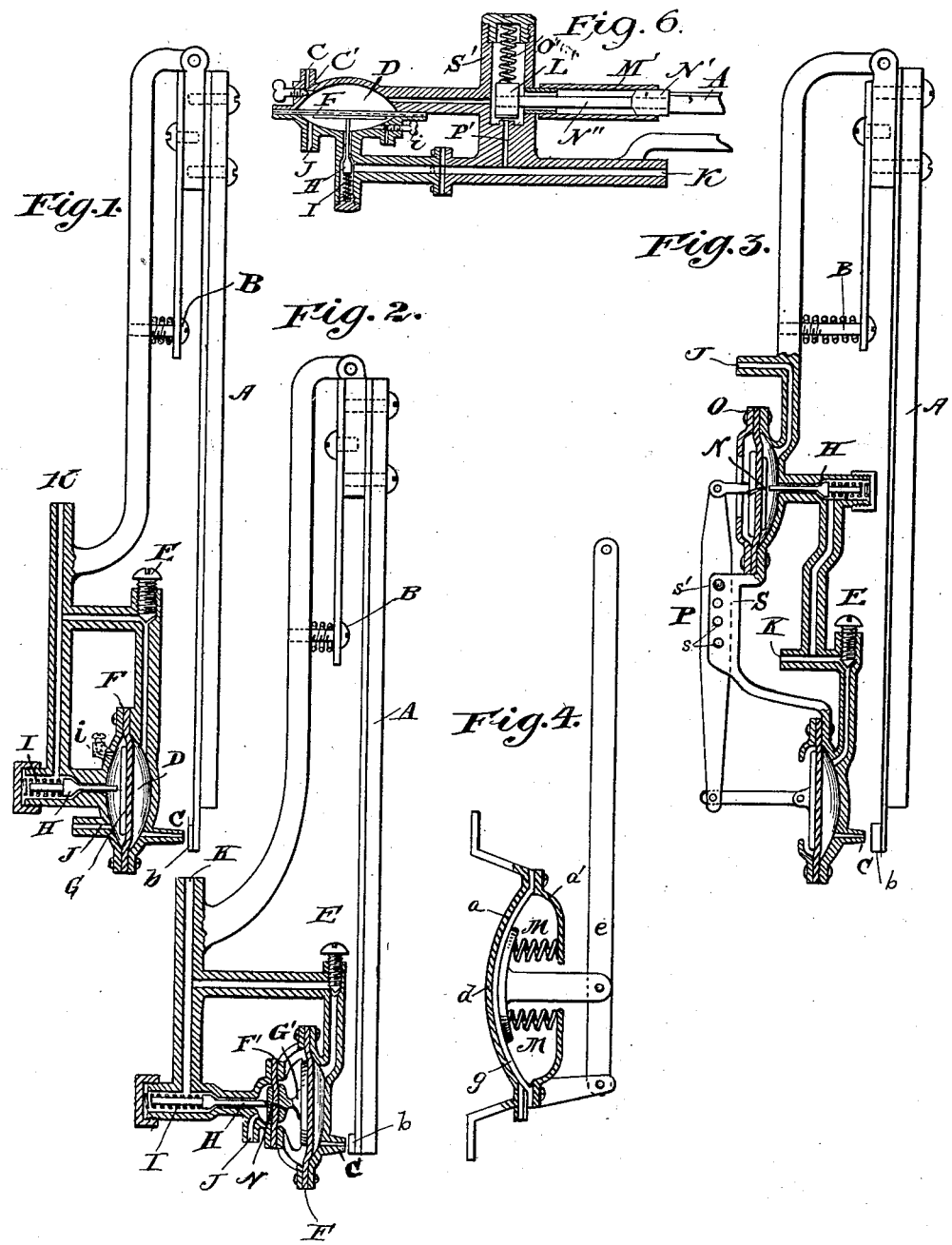

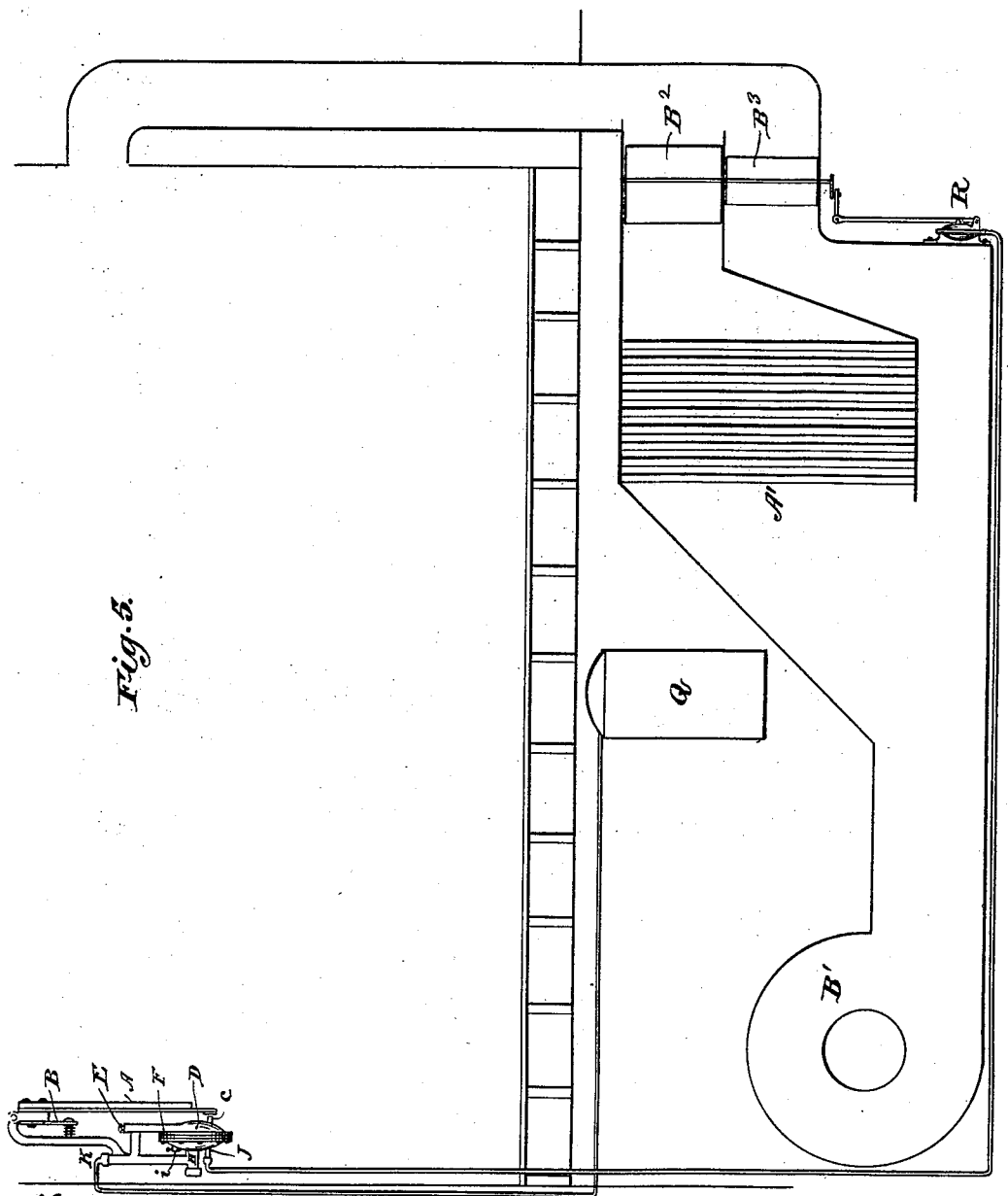

WILLIAM P. POWERS, OF CHICAGO, ILLINOIS.

MEANS FOR REGULATING THE TEMPERATURE OF HEATING SYSTEMS.

SPECIFICATION forming part of Letters Patent No. 710,301, dated September 30, 1902.

Application filed December 26, 1896. Serial No. 617,121. (No model.)

*To all whom it may concern:*

Be it known that I, WILLIAM P. POWERS, a citizen of the United States, residing at Chicago, in the county of Cook and State of Illinois, have invented certain new and useful Improvements in Means for Regulating the Temperature in Heating Systems, of which the following is a specification.

This invention relates to the automatic control of temperature in systems where the heating is effected by currents of hot and cold air, either by natural circulation or by the help of mechanical appliances, the intention being to secure such control by the use of compressed air thermostatically maintained at a pressure proportionate to the temperature and suitable pressure-motors in which this variable pressure is utilized to produce the necessary movements of the dampers controlling the supply of hot and cold air. An appliance of this kind is shown in Letters Patent issued to me April 21, 1896, No. 558,610, and also in Letters Patent issued to me February 11, 1896, No. 554,398. In both of these patents the thermostatic action comes primarily from the expansion of a volatile liquid confined in an elastic chamber, the movable side of which produces the mechanical effects necessary to bring into play the heat-controlling influences.

In the present invention I use, preferably, the well-known form of thermostat, composed of two substances having dissimilar rates of expansion, by which a movement in one direction or the other is produced at the free end of the thermostat by changes of temperature. In connection with this thermostatic bar I use a pressure-chamber having a constant but restricted supply of compressed air, the operation being substantially like that described in Patent No. 236,520, of January 11, 1881, issued to George Westinghouse, Jr., in which a thermostat is arranged to open and close by its movement an escape, by means of which the air-pressure passing into the pressure-chamber is made effective or non-effective, as the case may be. In my device whenever pressure accumulates in this chamber, owing to the closing partially or wholly of the escape-opening, it results in a movement of the diaphragm of the pressure-chamber and through suitable connections serves to open a valve controlling a supply of fluid-pressure, which is thus permitted to flow into another and larger pressure-chamber, by means of which the heat-controlling devices are operated This air-pressure also acts in opposition to the movement of the diaphragm which is under the influence of the initial pressure, and thereby serves to limit its action and permit the opening of the valve to an amount just sufficient to produce a pressure in the main pressure-motor equal to that existing in the chamber which is thermostatically controlled and which I will hereinafter call the "primary" one. The pressure-chamber operating the heat-controlling devices I will call the "secondary" one.

Figure 1 is a view, partly in section, of the thermostat and primary motor. Fig. 2 is a similar view showing a modified form of primary motor. Fig. 3 is a similar view of the thermostat in connection with still another form of primary motor. Fig. 4 shows the secondary pressure chamber or motor as ordinarily constructed; and Fig. 5 is a diagrammatic view of the complete system, showing the manner of its operation. Fig. 6 is a view of another modified form of primary motor.

In Fig. 1, A represents the well-known thermostatic bar, formed of materials having different rates of expansion—for instance, vulcanized rubber and steel. This is hinged at the upper end to the frame of the thermostat, and its position is made adjustable by the screw B. At its lower and free end is arranged a pad $b$, of some soft substance, usually patent-leather, which operates in juxtaposition to the small orifice C, communicating with the pressure-chamber D. Into this primary pressure-chamber there is a constant supply of compressed air or other gas, the amount of which is restricted by the adjusting-valve E. A very limited amount of fluid is sufficient to answer the purpose. It is common to use air-pressure maintained in a suitable tank by some form of air-compressor, ordinarily either steam or hydraulic. The escape-opening C must be larger than the passage through which the air-pressure enters, so that when open the air will escape from the primary chamber faster than it can enter through the restricting-valve E. This primary pressure-chamber is provided with an elastic diaphragm F, to which is attached a piston-plate G, which when the diaphragm is flexed by pressure impinges against the stem of the valve H and serves to open same against the air-pressure and the force of the spring I, which constantly tends to close the valve. The passage controlled by valve H ordinarily connects with the passage leading to the primary pressure-chamber behind the restricting-valve E, so that one source of air-pressure answers for both. This, however, is not essential, as these two pressures might be taken from different sources. Connecting with the valve side of the primary pressure-chamber there is an opening J, which connects by means of a pipe with the motor which operates the dampers or heat-controlling devices. At K a pipe is connected which leads to the tank containing the supply of fluid-pressure. At $i$ is a small escape-valve controlling the discharge of fluid-pressure from the valve side of the primary chamber and the motor connected therewith. This valve is adjusted in a manner to permit the air to escape very slowly, and there is accordingly a constant discharge whenever pressure exists in the motor and its connections.

The operation is as follows: Supposing that the escape-opening C is open and the temperature in the apartment in which the thermostat is located is rising, under the influence of increasing temperature, the thermostatic bar A expanding more rapidly on the out than the in side, a movement is produced at the free end which results in limiting the escape of air at C. This results in a pressure accumulating in the chamber D in direct proportion to the relation between the amount of air passing through valve E and that escaping at C, this pressure increasing as valve C is more completely closed. When sufficient pressure is developed in chamber D to overcome the tension of spring I and the resisting air-pressure, the result is the unseating of the valve H, which permits a movement of the air into the pressure-chamber and through the connecting-passage into the damper-operating motor. Whenever this pressure equals that developed in the primary pressure-chamber, the diaphragm moves back and valve H returns to its seat from the effects of spring I, thus shutting off the passage of any further supply of air into the operating-motor. As the air in the motor and connecting-pipes and chamber is depleted through the constant escape at $i$, the pressure becoming less than that in the primary pressure-chamber, a slight movement of the diaphragm will occur, which will open the valve H and admit a further supply of air to maintain the necessary equilibrium. If now through the temperature still further rising the thermostatic bar shall cause the pad at its lower end to come closer to and thereby further restrict the escape-opening C, it will result in an increase of pressure in the chamber D, which, through the process already described, will result in the admission of a greater pressure on the opposite side of the diaphragm and in the motor connecting therewith. It is thus seen that the pressure in the motor will at all times be substantially the same as that produced in the primary pressure-chamber by the movement of the thermostatic bar. This pressure may be utilized to operate any form of motor; but I preferably use the one shown in Fig. 4. As here illustrated, it comprises two parts $a$ and $a'$, which constitute a casing for a diaphragm $g$, which is clamped between them. Resting on this diaphragm is a piston-plate $d$, which actuates a lever $e$, properly supported from the diaphragm-casing. The piston-plate is firmly pressed against the elastic diaphragm by means of suitable springs M M, by which a variable resistance is secured to the movement of the diaphragm. It is evident that in this form of the appliance the pressure in the motor-chamber will at all times be substantially the same as that produced in the primary chamber by the opening and closing of the thermostat-valve.

It is sometimes desirable that the resulting pressure in the secondary motor should be maintained at a greater or less tension than that in the primary chamber. To secure such results, I have provided the means shown in Figs. 2 and 3. This is accomplished in Fig. 2 by the use, in connection with the primary chamber, of a second diaphragm F', differing in size from that against which the primary air-pressure is exerted, a solid piston-plate G' being interposed between these two diaphragms, by which the movement of one is transmitted to the other. If, as shown in the drawings, this second diaphragm be made of less area than the primary one, it follows that more pressure will be required to balance the pressure primarily produced by the thermostat and to permit the valve H to reseat, and consequently the resulting pressure in the secondary chamber or motor will be greater than that existing in the primary chamber, and each variation in the primary chamber will result in an increased ratio in the secondary.

The two diaphragms shown in Fig. 2 may be considered as the equivalent of a single diaphragm or piston having a larger exposed surface on one side than on the other, this form of the apparatus and that shown in Fig. 3 constituting a power-multiplying device.

In Fig. 2 I have omitted the permanent waste $i$ and substituted therefor an automatic waste consisting of an opening N through the diaphragm, which, together with the end of the valve H, forms an exhaust-valve, through which the excess of the air-pressure in the motor escapes whenever a reverse movement of the two diaphragms takes place. With this construction waste of air is prevented, for the reason that the supply and exhaust valve can never both be open at the same time. When the diaphragms are expanded with sufficient force to open valve H, the contact of the stem of valve H has closed the escape-opening N, and whenever through a lowering of the pressure in the primary chamber the diaphragms recede more than is sufficient to allow valve H to close the opening through N becomes effective and the air-pressure is discharged until the pressure in the two chambers is brought into proper proportion, due to the relative size of the two diaphragms. In other respects the operation is the same as in Fig. 1. It is evident that some form of automatic waste may be used in Fig. 1, if desired.

In Fig. 3 I have shown a diaphragm in a separate chamber O, to which the motion is transmitted by means of a lever P, this lever being the equivalent of the solid piston G' in Fig. 2. This lever rests upon a support S, which is provided with a series of perforations $s$, through any one of which the pin $s'$ is adapted to be placed. The lever is also provided with a series of holes which register with those in the frame, so that the pin $s'$ may be placed in any one of the holes. This constitutes a movable fulcrum, which affords an opportunity to vary the relative pressure in the motor-chamber by changing the leverage. With this construction the diaphragms may each be of the same size and the effective pressure in the secondary motor may be varied. It is obvious that in either of these constructions less pressure can be maintained in the secondary chamber than in the primary by making, in Fig. 2, the second diaphragm larger than the first and, in Fig. 3, by moving the fulcrum of the lever to a point nearer the end operated upon by the primary pressure. In this construction the automatic waste-port N is employed.

In Fig. 5 I have shown a heating-coil A' arranged in connection with a divided air-passage and means for forcing air through the same, (shown at B',) with dampers B² B³ arranged in the two passages to control the relative amounts of the heated and cool air. These dampers are commonly arranged so that one shall open as the other closes, and vice versa. The two currents of air are mixed in the duct beyond the dampers and discharged into the apartment through the duct shown. The thermostat, somewhat enlarged, is shown attached to the wall of the apartment and a pipe connecting it with the air-pressure tank Q. There is also a pipe leading from the thermostat to the damper-operating motor R. (Shown in detail in Fig. 4.)

It is not the intention to limit my invention to the precise details shown, as any form of dampers or valves may be used to control the air-supply to the apartment; nor is it the intention to limit myself to the specific form of thermostat shown in the drawings, as any of the well-known forms of thermostats may be used to open and close the escape from the primary chamber.

Fig. 6 shows a modified form of primary chamber where the inlet is controlled by the thermostat, the pressure fluid being discharged through a restricted opening $c$, constituting a permanent waste. In this form of the apparatus I use a valve L', which when pressed down by the spring O' closes the port P' and prevents the passage of the pressure fluid into the primary chamber. A is the thermostatic bar, which at its lower end is provided with a cylindrical extension N'. The chamber for the valve L' is also provided with a cylindrical extension S'. A flexible tube M', usually of rubber, forms an air-tight connection between S' and N', which permits of the movement of the valve-actuating rod N'', which is connected with N' and which by its outward movement serves to raise the valve L' from its seat. The escape-opening $c$ is provided with a restricting-valve $c'$.

The general theory of my invention and its principle of action are as follows: The pressure fluid passing from a source of supply is utilized in a motor for the purpose of regulating temperatures, said motor controlling the main valve or damper, and the pressure fluid is admitted to and released from said main-valve motor under the direction and control of a thermostat. This direction and control is secured by interposing a valve mechanism in the pressure-fluid-supply pipe, which valve mechanism is controlled by a secondary motor, said secondary motor having a movable diaphragm or wall, the movement of which operates the supply-valve and two connections with a pressure-fluid supply, these connections being so arranged as to admit the fluid-pressure to opposite sides of the movable part of the supply-valve motor, the pressures thus admitted acting in opposition to each other upon the movable part of the supply-valve motor, and one of the connections being controlled by the thermostat.

Having thus described my invention, what I claim is—

1. In a heat-controlling device the combination of a source of fluid-pressure supply with a chamber having a movable wall and an inlet-port and an outlet-port, a thermostatically-actuated valve for one of said ports, a second chamber having an inlet and an outlet port, a valve for the inlet-port, a principal valve, a motor for said valve communicating with the outlet-port of the second chamber, the inlet-valve of said second chamber being so connected with the movable wall of the first-named chamber as to be moved thereby, and the two chambers being so related that the pressure in the second chamber will act in opposition to the pressure in the first-named chamber.

2. In a heat-controlling device, the combination with an expansible chamber, having an inlet and an outlet for fluid-pressure, one of which is thermostatically controlled; of a pressure-chamber having a fluid-pressure supply; a valve controlling said supply, said valve being adapted to be opened by the movable wall of the expansible chamber, whereby to admit the pressure fluid to act on said movable wall in opposition to the pressure thermostatically produced in the expansible chamber.

3. In a heat-controlling device, the combination of a source of fluid-pressure, a chamber having an inlet-port and an outlet-port communicating with the source of fluid-pressure, a thermostatically-actuated valve for one of said ports, a second chamber having an inlet-port and an outlet-port, a source of fluid-pressure therefor, a valve for the inlet-port, a movable wall forming one side of each chamber, a principal valve, a motor for said valve communicating with the outlet-port of the second chamber, the inlet-valve of the second chamber being actuated by the movable wall, and the pressures in the two chambers acting in opposition to each other, substantially as described.

4. In a heat-controlling device, the combination of a source of fluid-pressure, a chamber having an inlet-port and an outlet-port communicating therewith, a thermostatically-actuated valve for one of said ports, a second chamber having an inlet-port and an outlet-port, a valve for the inlet-port, a source of fluid-pressure for the second chamber, a movable wall forming one side of each chamber, the sides of the wall which are exposed to pressure being of unequal areas, a principal valve, a motor therefor communicating with the outlet-port of the second chamber, the inlet-valve of the second chamber being actuated by the movable wall, and the pressures in the two chambers acting in opposition to each other, substantially as described.

5. In a heat-controlling device, the combination of a source of fluid-pressure, a chamber having an inlet-port and an outlet-port communicating therewith, a thermostatically-actuated valve for one of said ports, a second chamber having an inlet-port and an outlet-port, a source of fluid-pressure for said second chamber, a valve for the inlet-port, a flexible diaphragm forming one side of each chamber, a principal valve, a motor for said valve communicating with the outlet-port of the second chamber, a waste-port in the second chamber, the inlet-valve for the second chamber adapted to be actuated by the movable wall, and the pressures in the two chambers acting in opposition to each other, substantially as described.

6. In heat-regulating apparatus, the combination with a fluid-pressure supply, a heat-controlling valve or damper and a fluid-pressure motor for operating the same, of valve mechanism for controlling the supply and release of the fluid-pressure medium to and from said motor, a secondary fluid-pressure motor for operating said valve mechanism, two fluid-pressure-supply connections arranged to admit the fluid-pressure to opposite sides of the movable part of said motor, whereby to act in opposite directions upon said movable part, one of said connections being controlled by said valve mechanism, and a thermostat controlling the relative supply and waste of the pressure fluid admitted through the other connection, the source of fluid-pressure supply being independent of the thermostat.

7. In a heat-controlling device, the combination of a source of fluid-pressure, a chamber having an inlet-port and an outlet-port communicating with the source of pressure, a thermostatically-actuated valve for one of said ports, a second chamber having an inlet-port and an outlet-port, a source of fluid-pressure for the second chamber, a movable wall forming one side of each of such chambers having an orifice forming communication between the second chamber and the external atmosphere, a valve governing the inlet-port of the second chamber, a valve-stem attached to the valve of the second chamber, another valve on the opposite end of this stem adapted to control the orifice through the movable wall, a principal valve, a motor for said valve communicating with the outlet-port of the second chamber, the inlet-valve for the second chamber being actuated by the movable wall, substantially as described.

WILLIAM P. POWERS.

Witnesses:
F. W. POWERS,
H. M. POTTER.